United States Patent
Woods

[19]

[11] Patent Number: 6,091,063
[45] Date of Patent: Jul. 18, 2000

[54] METHOD FOR IMPROVING THERMAL UNIFORMITY IN INDUCTION HEATING PROCESSES

[75] Inventor: Edward J. Woods, Poulsbo, Wash.

[73] Assignee: The Boeing Company, Seattle, Wash.

[21] Appl. No.: 09/187,614

[22] Filed: Nov. 6, 1998

[51] Int. Cl.[7] .................................................. H05B 6/10
[52] U.S. Cl. .......................... 219/645; 219/633; 219/646; 219/659
[58] Field of Search .................................. 219/600, 604, 219/633, 645, 670, 646, 659

[56] References Cited

U.S. PATENT DOCUMENTS

| | | | |
|---|---|---|---|
| 2,299,934 | 10/1942 | Sherman et al. | |
| 4,539,456 | 9/1985 | Mohr | 219/604 |
| 4,673,781 | 6/1987 | Nuns et al. | 219/633 |
| 5,510,600 | 4/1996 | Jackson | 219/645 |
| 5,630,958 | 5/1997 | Stewart, Jr. et al. | 219/670 |

*Primary Examiner*—Tu Ba Hoang
*Attorney, Agent, or Firm*—John C. Hammar

[57] ABSTRACT

An induction heating workcell having a fixed solenoid coil heats parts more uniformly by aligning ferrite blocks, generally along the centerline of the coil, to improve uniformity of the magnetic field, magnetic flux, and power density. The blocks are nonconducting but have a high magnetic permeability so that flux prefers to travel through the block over surrounding structure. Therefore, the blocks are flux shapers that produce the desired temperature control.

8 Claims, 6 Drawing Sheets

4
METHOD FOR IMPROVING THERMAL UNIFORMITY IN INDUCTION HEATING PROCESSES

TECHNICAL FIELD

The present invention relates to a fixed coil induction heating workcell using nonconducting magnetic ferrite ceramic blocks having a high magnetic permeability generally along the centerline of the coil to improve thermal uniformity in the workpiece by shaping the magnetic flux that the coil produces.

BACKGROUND ART

The present invention improves thermal uniformity of a workpiece being heated in a fixed coil induction heating workcell of the kind described in Boeing's U.S. Pat. No. 5,624,594. The workcell is useful for processing metals or resin composites, especially in combined cycle operations that greatly reduce processing time. These operations achieve the best results when the operating temperature is uniform in the workpiece. For simplicity, for the remainder of this description we will refer to manufacturing problems with reference to composite processing. The manufacturing problems associated with metal processing, like SPF, brazing, and the like, are comparable to those for composite manufacturing, if not more significant, because even higher temperatures are required.

1. Composite Manufacturing

Fiber-reinforced organic resin matrix composites typically have a high strength-to-weight ratio and a high stiffness-to-weight ratio. Desirable fatigue characteristics, especially for sandwich panels, make them increasingly popular as a replacement for metal in aerospace applications where weight, strength, or fatigue is critical. Manufacturing these thermoplastic or thermoset composites is expensive today. Improved manufacturing processes would reduce their cost by reducing touch labor and forming time.

Prepregs combine continuous, woven, or chopped reinforcing fibers with an uncured, matrix resin, and usually comprise woven or unidirectional fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. The resin in the prepreg lay up usually is consolidated (i.e. pressed to remove any air, gas, or vapor) and cured (i.e., chemically converted to its final form, usually through chain-extension) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delays caused to heat and to cool the mass of the tools adds substantially to the overall time necessary to fabricate each part. These delays are especially significant when the manufacturing run is small and at a low rate. In these circumstances, the dies need to be changed frequently, often after producing only a few parts of each kind. Change out of the dies requires the long times associated with heating and cooling. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part. So, the tooling is expensive to manufacture and expensive to use because of the relatively long processing times increased with heating and cooling of the tooling.

Actively cooling the tools after forming the composite part has shortened the time necessary to produce a composite part, but the cycle time for and cost of heating and cooling remains significant to overall fabrication cost. Designing and making tools to permit their active cooling increases the cost of the tools.

Boeing described a process for organic matrix forming and consolidation using induction heating in U.S. Pat. No. 5,530,227. There, prepregs were laid up in a flat sheet and were sandwiched between aluminum susceptor facesheets. The process was similar to the "double diaphragm" forming process described in U.S. Pat. No. 4,657,717, except that the facesheets were susceptible to heating by induction and formed a retort to enclose the prepreg preform. To ensure an inert atmosphere around the composite during curing and to permit withdrawing volatiles and outgassing from around the composite during the consolidation, the facesheets were welded together around their periphery. Welding added preparation time and increased the cost for part fabrication by adding labor and material cost. Welding ruined the facesheets and prohibited their reuse which added a significant cost penalty to each part. In U.S. Pat. No. 5,599,472, a technique reliably seals facesheets of the retort without the need for welding and permits reuse of the facesheets in certain circumstances.

2. Processing in an Induction Press

Boeing uses ceramic dies for induction processing because a ceramic is not susceptible to induction heating and, preferably, is a thermal insulator (i.e., a relatively poor conductor of heat). Additional reinforcement can be added, if desired, as described in U.S. Provisional patent application Ser. No. 60/071,765. Cast ceramic tooling is strengthened and reinforced internally with fiberglass rods or other appropriate reinforcements and externally with metal or other durable strongbacks. The reinforcement permits the dies to withstand the temperatures and pressures necessary to form, to consolidate, or otherwise to process the composite materials or metals. Cast ceramic tools cost less to fabricate than metal tools of comparable size. We embed induction heating elements in the ceramic tooling to heat the composite or metal retort without significantly heating the tools. The induction heating elements form a water cooling network within the induction coil. Thus, induction heating can reduce the time required and energy consumed to fabricate a part.

While graphite or boron fibers can be heated directly by induction, most organic matrix composites require a susceptor in or adjacent to the composite material preform to have the band line uniformly for consolidation or forming, without causing other problems with the laminates. The susceptor is heated inductively and transfers its heat principally through conduction to the preform or workpiece that, in our prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort and workpiece and eliminates wasteful, inefficient heat sinks in the tooling. Because the ceramic tools in our induction heating workcell do not heat to as high a temperature as the metal tooling of conventional presses, problems caused by different coefficients of thermal expansion between the tools and the workpiece are reduced. A significantly higher percentage of our input energy goes to heating the workpiece than occurs with conventional presses. Our reduced thermal mass and ability to focus the heating energy permits us to change the operating temperature rapidly which improves the products we produce. Finally, the factory is not heated as significantly from the radiation of the large thermal mass of a conventional press, and is a safer and more pleasant environment for the press operators.

In induction heating for consolidating and/or forming organic matrix composite materials, we place a thermoplastic organic matrix composite preform of PEEK or ULTEM, for example, within a metal susceptor envelope (i.e., retort). These thermoplastics have a low concentration of residual volatile solvents and are easy to use. The susceptor facesheets of the retort are inductively heated to heat the preform. Consolidation and forming pressure consolidate and, if applicable, form the preform at its curing temperature. The sealed susceptor sheets form a pressure zone. We evacuate the pressure zone in the retort in a manner analogous to conventional vacuum bag processes for resin consolidation. For resins like ULTEM polyimide that include a smaller amount of volatiles, we can pressurize this zone to enhance consolidation. The retort is placed in an induction heating press on the forming surfaces of dies having the desired shape of the molded composite part. After the retort and preform are inductively heated to the desired elevated temperature, we apply differential pressure (while maintaining the vacuum in the pressure zone around the preform) across the retort. The retort functions as a diaphragm in the press to form the preform against the die with controllable tooling pressure into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as the diaphragm in this situation.

Boeing performs a wide range of manufacturing operations in its induction heating press at operating temperatures ranging from about 350° F. (175° C.) to about 1950° F. (1066° C.). For each operation, it is necessary to hold the temperature relatively constant for several minutes to several hours. Temperature control by controlling the input power fed to the induction coil is too crude. A better and simpler way capitalizes on the Curie point. By judicious selection of the metal or alloy in the retort's susceptor facesheets, we can avoid excessive heating irrespective of the input power. The improved control and improved temperature uniformity in the workpiece from the Curie point materials produces better products. The Curie point control method is explained in greater detail in U.S. Pat. No. 5,728,309. The Curie point control method controls the absolute temperature of the workpiece by matching the Curie point of the susceptor to the desired temperature of the induction heating operation being performed.

The Curie point improvement sometimes still fails to obtain substantial thermal uniformity in the workpiece. At the ends of the coil, the magnetic flux does not enter the workpiece uniformly to produce uniform heating. Hot spots can occur at the ends, or the ends can reach the Curie point faster than the middle of the workpiece, or vice versa. At the ends, the magnetic flux density in the air or ceramic die surrounding the workpiece is not uniform in part because this surrounding medium is not magnetic.

SUMMARY OF THE INVENTION

The present invention relates to regulating the temperature of a workpiece in induction heating processes using ferrite blocks to shape the magnetic field. The purpose is to obtain more uniform heating throughout the workpiece. The blocks are especially adapted for Boeing's induction heating workcell where a fixed solenoid coil surrounds the workpiece. The blocks usually are positioned along the centerline of the coil at its ends and outside the workpiece to expose the workpiece to more uniform magnetic flux. Uneven heating often occurs in the workpiece when ferrite blocks are not used, because changes in the flux density at the open ends of the induction coil, the shape of the workpiece, changes in shape or conductivity of the workpiece along its profile, or some combination of these produces nonuniform flux and nonuniform induction heating. Ferrite blocks have a high magnetic permeability and are nonconducting. They are positioned to direct flux to the workpiece (particularly at the ends of the coil) to increase the temperature where the heating otherwise is lagging. They will improve heating uniformity if they have a magnetic permeability greater than that of air. Typically the blocks have a permeability significantly greater than air, such as 100–1000 times the permeability of air or free space, and, generally, about 10–100 times the permeability of air at the elevated operating temperatures of interest. Ceramic ferrites have high resistivity and extremely low loss.

The blocks are usually placed at the ends of the part and coil substantially along the centerline of the coil. Blocks, however, can be positioned within the coil between separate workpieces in the dies to define separate work zones. In this way, multiple parts can be processed at one time. The blocks can also be used to concentrate flux at selected locations, such as areas where bonding is desired in the workpiece. Finally, blocks can be positioned off the centerline to reduce local heating between the blocks by withdrawing flux from the underlying part that has a lower magnetic permeability.

DETAILED DESCRIPTION OF A PREFERRED EMBODIMENT

1. Boeing's Induction Heating Press

The Boeing induction heating workcell and its operation are described in several of the patents identified in the Background. We will briefly describe the equipment once again, however, before describing the improvements to the workcell and to processes using this invention.

Figure 1:
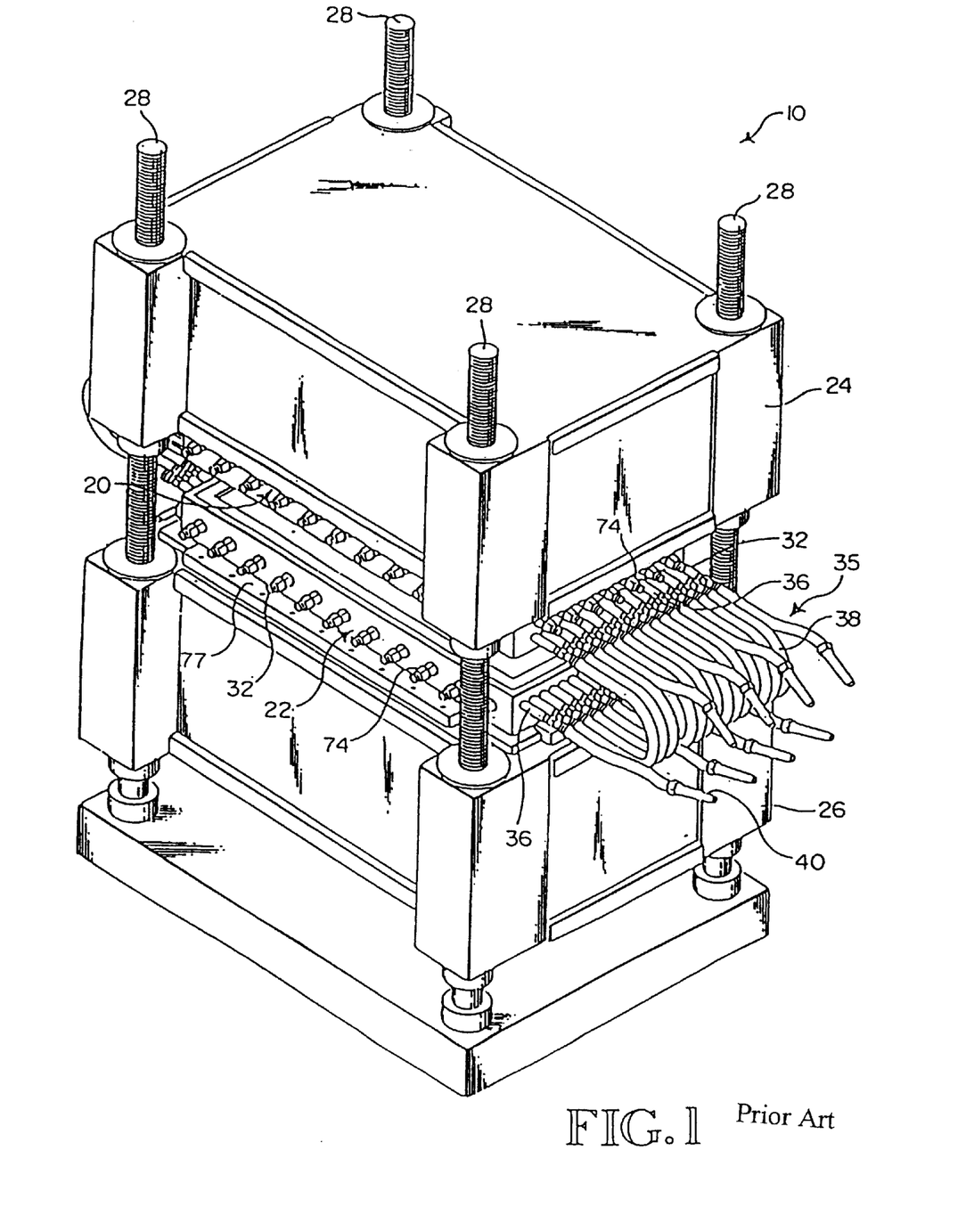
FIG. 1 is a perspective view of our induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 in/ft$^2$ of the forming surface. Such tolerances are desirable to achieve proper part tolerances. The strongbacks may be steel, aluminum, or any other material capable of handling the loads present during forming or consolidation, but we prefer materials that are non-magnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually cast ceramic and are reinforced with a plurality of fiberglass rods 32. The rods are held with bolts 74 and that extend both longitudinally and transversely in a grid through each die. Each die usually is framed with phenolic reinforcement 72 to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to induction heating so that an induction coil embedded in the dies localizes heating in the retort rather than in the dies. The ceramic preferably has a low coefficient of thermal expansion, good thermal shock resistance, and relatively high compression strength, such as a castable fused silica ceramic.

Figure 2:
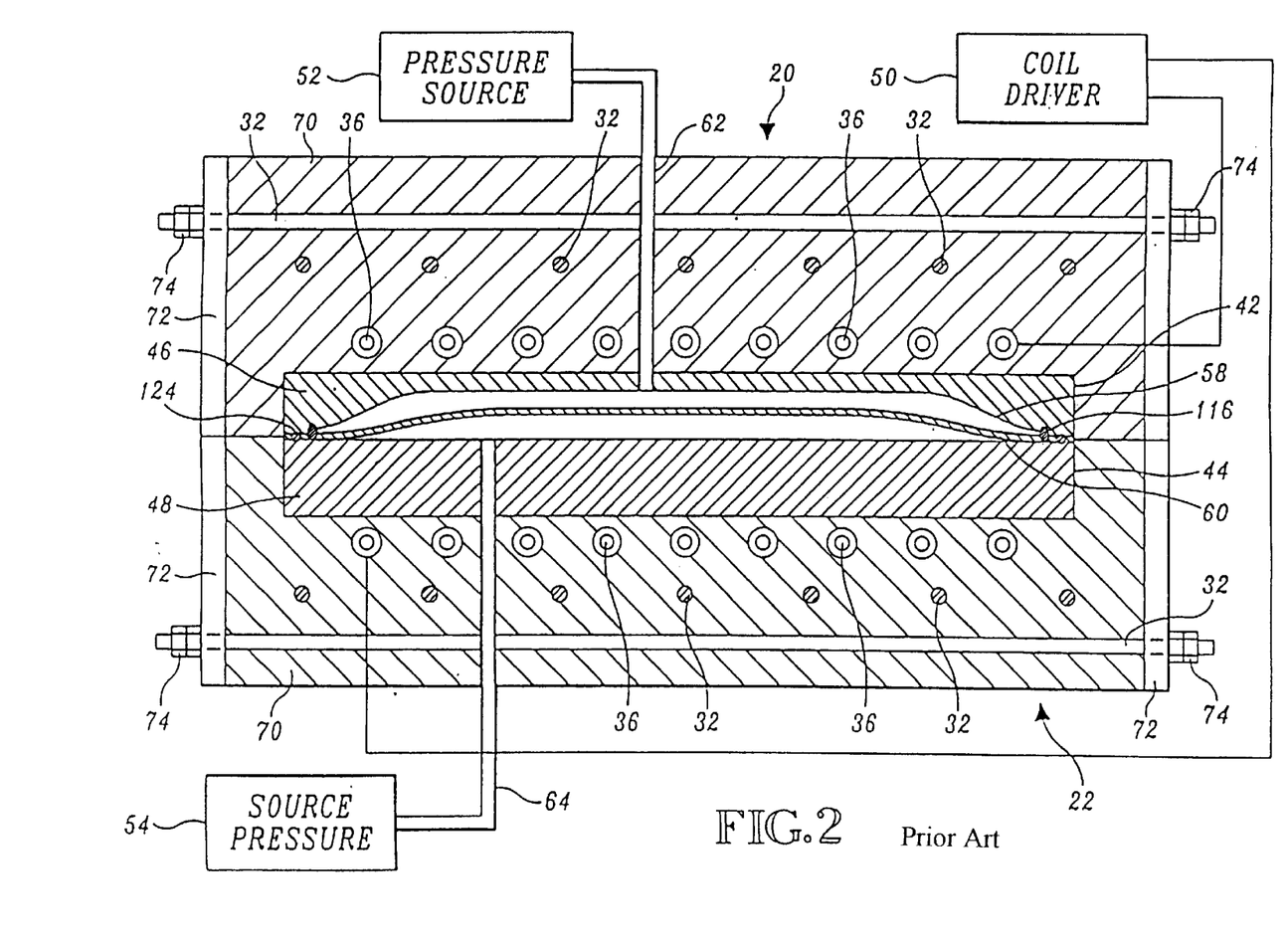
FIG. 2 is a schematic sectional view of the induction heating workcell of FIG. 1.
Figure 4:
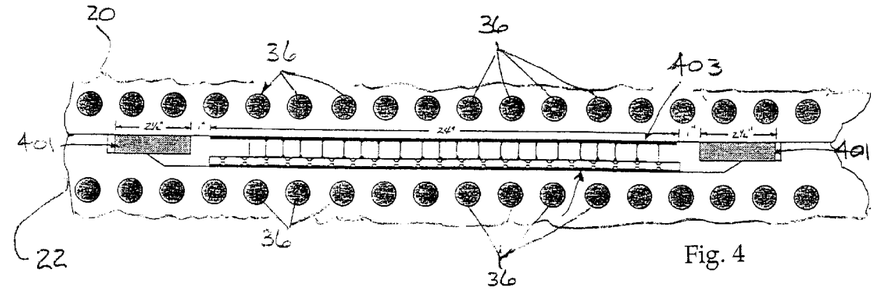
FIG. 4 is a schematic sectional view of a die arrangement using ferrite blocks in accordance with the method of the present invention in the brazing of a titanium honeycomb panel inside a "smart" retort.

In FIG. 2, nine sections of the solenoid induction coil are cast into both the top and bottom dies. The number of sections in each die (and the resulting number of turns in the coil) usually is higher, as shown in FIG. 4. The sections are positioned generally to surround the cavity on all sides. Each section is copper tubing (or another, hollow conductor) 36 that extends along the length of each die. A flexible coil connector 38 joins the tubing 36 in the upper die 20 to the corresponding tubing in the lower die 22. Connectors 40 located at the ends of the induction coil 35 connect the induction coil 35 to an external power source or coil driver 50 and to a circulation system for supplying cooling fluid that flows in the tubing. Although shown as round in FIGS. 2 and 4, the shape of the tubing is arbitrary. Boeing often uses rectangular channels.

Cavities 42 and 44 in the respective dies may hold tool inserts 46 and 48, but, generally, are a single piece. A tooling surface 58 is formed into the inner face of the upper die, and is contoured to a shape corresponding to the desired shape of the outer mold line surface of the completed composite. The lower die or tool insert determines the inner mold line. Tool inserts, if used, should not be susceptible to induction heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. Ceramic tooling provides the greatest flexibility and versatility. The forming surfaces can be an integral part of the dies.

Each die surrounds and supports its respective tool insert and holds the tubing sections 36 of the induction coil in proper position in relationship to the tool insert. In the preferred embodiment, the interior 70 of the dies is formed of a castable phenolic or ceramic and the exterior sides from precast composite phenolic resin blocks 72. In some applications, chopped fibers or nonwoven or woven reinforcing mats reinforce the phenolic or ceramic.

FIG. 2 shows a retort 60 between the tool inserts 46 and 48. The retort 60 includes a workpiece enclosed by sandwiching facesheets made from a material that is susceptible to induction heating. These susceptor facesheets may be magnetic or non-magnetic (like copper). The retort is heated to an operating temperature of interest by energizing the coil 35. For forming a composite panel, when the panel reaches the temperature at which the matrix resin flows, we can apply gas pressure to the outer surfaces of the retort by pressure sources 52 and 54. Pressure source 52 applies pressure in the form of a pressurized fluid to the upper surface of the retort 60 through a conduit 62 that passes through the upper die 20 and upper tool insert 46, while pressure source 54 applies pressure through a pressurized fluid to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure (e.g., the pressure on the top exceeds that on the bottom) to the retort 60.

An alternating electrical current in the induction coil 35 produces a time varying magnetic field that induces currents that heat the susceptor face-sheets. The frequency at which the coil driver 50 drives the coils 35 depends upon the nature of the retort 60. Boeing usually powers the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity, as discussed in U.S. Pat. No. 5,641,422. Field uniformity usually is important to achieve temperature uniformity in the retort. Uniform heating insures that all portions of the workpiece will reach the operating temperature at approximately the same time. Solenoid type induction coils are preferred. Greater field uniformity is produced in a retort that is located symmetrically along the centerline of the surrounding coil. Those of ordinary skill can establish series/parallel induction coil combinations, variable turn spacing, and distances between the part and the induction coil by standard electrical calculations to achieve the desired heating from whatever coil configuration is used. Ferrite blocks allow more uniform heating of the retort or part by shaping the magnetic field.

The tool inserts and dies are usually substantially thermally insulating to trap and to contain heat within the retort. The Boeing workcell requires far less energy to achieve the desired operating temperature than conventional autoclave or resistive hot press methods where the metal tooling is a massive heat sink. Operations using the Boeing induction heating workcell also are faster than prior art operations because they do not heat the large thermal mass of either the dies or tool inserts prior to the induction heating process. The susceptor is heated, the tool is not. Thus, the necessary processing temperature is achieved more rapidly. In addition, the highly conductive materials provide rapid heat transfer to the workpiece. When the driver 50 is de-energized, the dies cool rapidly to a temperature at which we can remove the workpiece from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermal cycle better to the desired process.

2. Thermoplastic Welding

Next, we will briefly describe thermoplastic welding in the induction heating workcell because it is a process where uniform heating over the entire part is beneficial.

Boeing made several changes to its induction heating workcell to adapt it to perform bondline thermoplastic welding. These changes are described in U.S. Pat. No. 5,705,796. The assemblies of primary interest for thermoplastic welding are wingskin/spar combinations. These parts are prefabricated so that the welding operation need only focus upon melting the thermoplastic while applying modest pressure to facilitate the fusion. A cavity is formed within the dieset to contain the wingskin/spar assembly. The cavity is substantially a cube or similar rectangular solid with canted edges and has major surfaces complementary to the contour of the assembly. The induction coils usually extend longitudinally in the same direction as the spars and usually are arranged near the surfaces of the major and canted surfaces as shown in U.S. Pat. No. 5,641,422. The skins and spars are assembled in the center of the cavity and are sandwiched between optional silicone rubber pressure pads that assure substantially uniform pressure distribution over the wingskin surfaces irrespective of surface features or irregularities. A susceptor tape is positioned along the bondline between the wingskin and the spar caps or we use our reinforced susceptor of U.S. Pat. No. 5,723,849. A "susceptor tape" means a metal ribbon embedded in thermoplastic resin or a structural susceptor as described in U.S. Pat. No. 5,717,191 having the resin-embedded ribbon sandwiched with alternating plies of thermoplastic film and fiber reinforcement to alleviate residual tensile strain in the weld and to simplify gap filling while ensuring a resin rich, quality weld. The metal ribbon may be copper, a cobalt alloy, nickel-iron alloys, or any other suitable "smart" susceptor from the alternatives discussed in U.S. Pat. No. 5,645,744 or 5,717,191, for example. The susceptor might be narrow metal strips about 0.10–0.20 in wide held in side-by-side array with the thermoplastic resin or woven with carbon fibers or other reinforcement. The susceptor should have a lower longitudinal impedance to promote longitudinal current flow. A modified, selvaged susceptor (see U.S. Pat. No. 5,508,496) has solid copper bands alternating with mesh sections with the solid bands in the bondline rather than falling outside it, since they are the primary current carriers. A preferred susceptor is a multistrip susceptor having a plurality of carrier strips about 0.10 inch wide separated by 0.20 inch wide gaps with periodic transverse positioning strips joining adjacent carrier strips.

A "susceptor tape," however, still suffers from a relatively low bond strength because the metal susceptor is asked to function as the equivalent of a reinforcing fiber. The matrix resin, however, does not wet with the metal as well as it does with the reinforcing fibers and the metal does not have the strength commonly available with the fibers. Therefore, a reinforced susceptor promises improved bond strength.

While alignment of the susceptors and the coil segments permits controlled welding along the bondlines, sometimes it is desirable to complete both the rib and spar welds simultaneously. This simultaneous welding can be done by molding the susceptor into the skin faying surface over the entire surface of the part or by changing the orientation of the coil segments with respect to the bondline susceptors. For rib-spar combinations (usually a 90° joint), the coil segments might be oriented 45° to either the rib or the spar. With this orientation, current is generated in both the rib and spar susceptors. The geometry with closeout structure which runs at skew angles is difficult. Here, susceptor design likely will play a role in achieving uniform heating on the skew bondlines simultaneously with that on the rib and spar bondlines.

A susceptor in the bondline complicates to the preparation of quality parts. A metal is used because of its high susceptibility, but metal differs markedly in physical properties from the resin or fiber reinforcement. Dealing with it is a significant issue. The reinforced susceptor overcomes problems with conventional susceptors by including the delicate metal foils (0.10–0.20 inches wide×0.005–0.010 inches thick; preferably 0.10×0.007 inches) in tandem with the warp fibers of the woven reinforcement fabric. The foil is always on the remote side of the fabric because it is between the warp thread and the weave threads. This arrangement holds the foils in place longitudinally in the fabric in electrical isolation from each other yet substantially covering the entire width of the weld surface while still having adequate space for the flow and fusion of the thermoplastic resin. Furthermore, in the bondline, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement the foil can readily assume the contour of the reinforcement. Finally, the arrangement permits efficient heat transfer from the foil to the resin in the spatial region where the bond will form.

With the wingskin/spar combination assembled on the pressure pads in the cavity, we close the dies and energize the coil using a frequency of about 3–10 kHz to produce about 400 kw. This energy produces an alternating magnetic field around the assembly (which preferably is aligned with the central axis of the coil) that rapidly heats the susceptors to the desired welding temperature. A "smart" susceptor made from a nickel-iron alloy will protect the bondline against overheating as well as assuring a substantially uniform temperature in the bondline during the fusion period when the thermoplastic resin is melted. The susceptor has a Curie point near the welding temperature which allows us to control temperature with the susceptor rather than with power control. Boeing can simultaneously make six welds (one weld on each spar cap of the 3 spars) as shown in U.S. Pat. No. 5,705,796, which greatly reduces processing time.

The welding process is quite fast taking about 25–30 minutes including heating to the melt, holding the temperature during the weld fusion, and cooling. Throughout the process, we maintain a pressure of about 30–100 psi along the bondline. The weight of the assembly may make the pressure slightly higher on the bottom than the top but this pressure difference should be insignificant to the quality of the weld and the performance of the completed part. The assembly is economical from a tooling standpoint because the same tools used to consolidate the wingskins can be reused in completing the welding.

While I refer to wingskin/spar cap welds, this welding process equally applies to wingskin/rib cap welds, and, generally, completes both welds simultaneously. I use "spar cap" and "rib cap" interchangeably unless the context forces a different meaning.

The welding process might cause the assembled combination to sag when the bondline reaches the melt temperature where the flow needed for focusing the fusion bond occurs. Therefore, it may be necessary to support the assembly from the inside. One support concept (described in U.S. Pat. No. 5,710,414) uses heat resistant silicone rubber bladders or other inflatable devices to fill the spaces defined by the assembled skins and spars. Other tooling might also be used, such as filling the space with salt or another material that we can later dissolve, including ceramics. If support tooling is used, the part design must be such that the support tooling can be removed after the welds are formed. In this case, for example, the combination cannot have completely closed cavities. It generally will not be closed, because ribs are omitted from the assembled combination. Welding ribs transverse to the magnetic field can be troublesome. If the ribs and the spars are welded simultaneously, then the coil segments will be at a skew angle relative to either the ribs or spars. In this case, obtaining even heating in both depends on the actual geometry of the wingbox that is being fabricated and on the configuration of the susceptor and of the magnetic field. The need to remove the support tooling can severely impact the parts we can fabricate.

The integrity of the weld is critical to the performance of the completed, welded structure. The quality of the weld is related to the temperature along the bondline and good welds require control of the temperature within a relatively narrow range during the welding. Boeing wants to avoid overheating, so a "smart" susceptor made from a Co, Ni, or Fe alloy with a Curie point slightly above the melting temperature of the resin will help produce quality welds. Furthermore, an alloy like Invar 42 (42% Ni-58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger.

3. Temperature Control Using Ferrite Blocks

Figure 3:
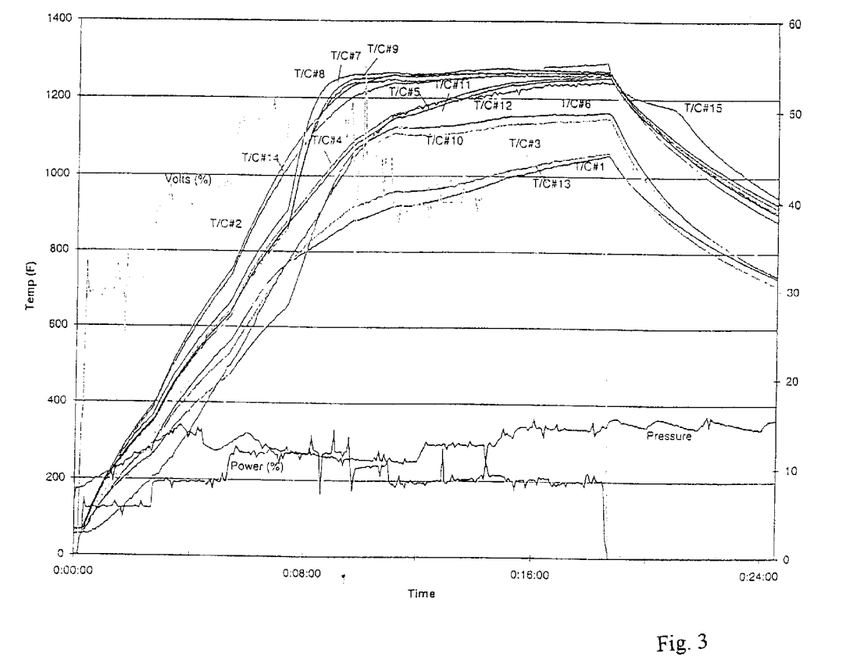
FIG. 3 is a graph plotting measured temperature at various locations in a titanium part over a period of time while applying relatively constant pressure and power in an induction heating workcell.

Because the coil in Boeing's induction heating workcell has open ends, and, in some situations, because of a changing profile of the part being heated, it is desirable to direct the magnetic flux into the heating surface with ferrite blocks to produce more uniform heating or to achieve local heating of the part at predetermined locations. To achieve the desired heating, it is necessary to alter the magnetic flux. Ferrite blocks along the centerline of the coil at its ends can produce the desired alteration in the flux. Without the blocks, ends of the part near the open end of a coil may not be heated to the same temperature as the center of the part, especially as the temperature climbs. Lag in heating at the ends can be seen in FIG. 3 for thermocouples numbered 4, 5, 11, and 12 for a titanium brazed panel.

In the past, shaping the coil was attempted to adjust the flux, but because of the relatively large coil turns, and the necessity of keeping the water-heated coil turns away from the heated surface, the alteration in the flux achieved by changing the coil shape could not be directed adequately to the areas that were not heating fast enough.

Figure 7:
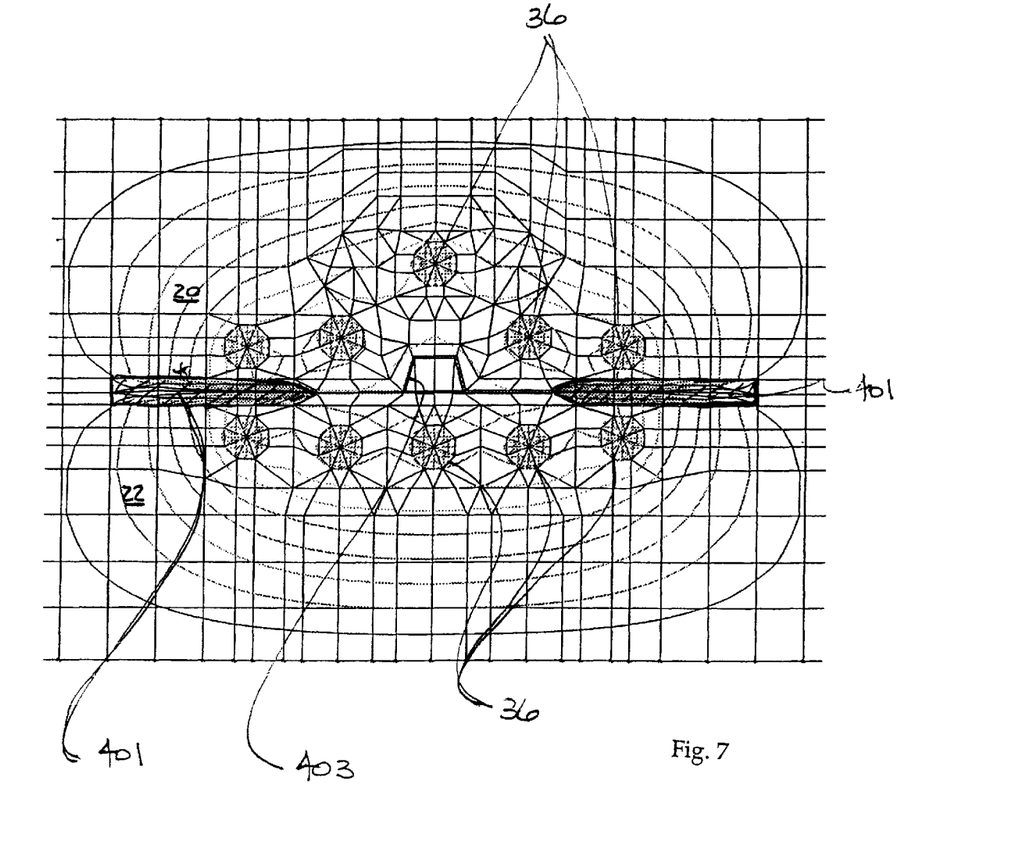
FIG. 7 is a schematic sectional view showing improvement in the uniformity in flux density into a susceptor enclosing a workpiece when using ferrite blocks at the ends of the coil.

The present invention uses nonconducting ferrite blocks 401 that sandwich the part 403 and enhance the field near the coil ends. These blocks 401 are shown as shaded rectangles in FIG. 4. They contain small, ferromagnetic particles that do not create eddy currents at the frequencies Boeing uses in its induction heating workcell. Because there are no eddy currents in the blocks, they do not heat by induction. They shape the magnetic field and flux, as shown in FIG. 7. Any finely laminated or nonconducting ferromagnetic material can be used so long as the magnetic permeability is substantially greater than air. Ceramic ferrites are the best candidates because they have high resistivity and extremely low loss at induction heating frequencies of several kilohertz. Its magnetic permeability is about 100–1000 times the permeability of air or free space at ambient temperature.

Figure 5:
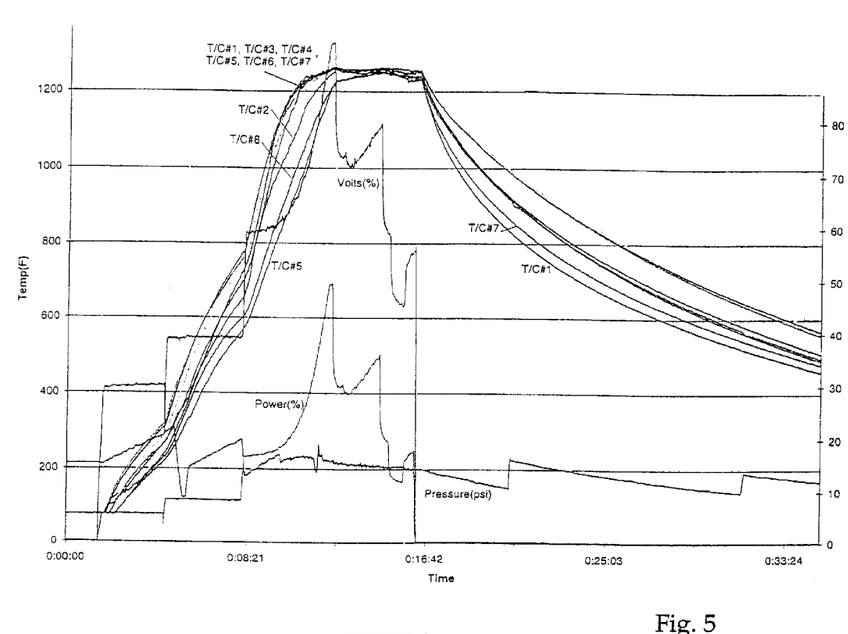
FIG. 5 is a graph, similar to FIG. 3, plotting measured temperature at various locations in a titanium part showing improvement in the temperature uniformity everywhere in the part during the processing cycle when using ferrite blocks.

With the ferrite blocks 401 in place substantially along the centerline of the coil, the heating of the conducting surfaces (i.e. susceptors) 405 within the coil is more uniform, as shown by the edge thermocouples numbered 1, 2, and 8 in FIG. 5.

Figure 6:
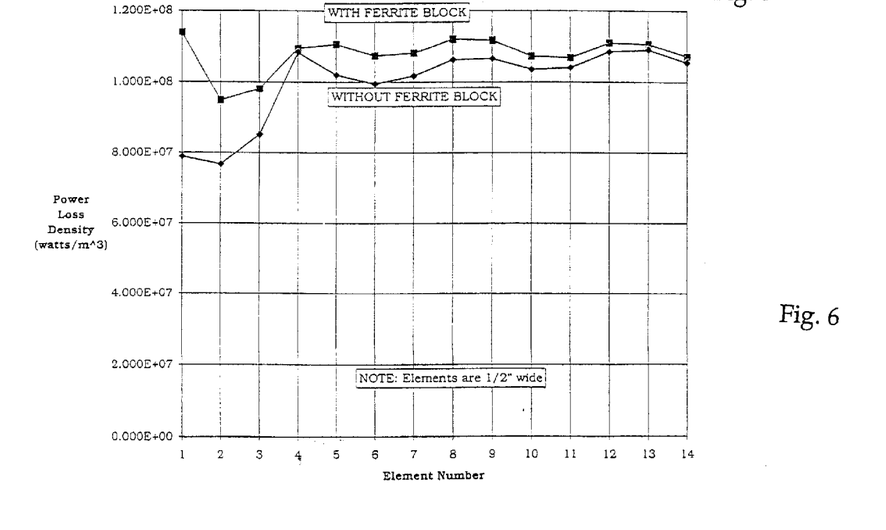
FIG. 6 is a graph showing how ferrite blocks improve uniformity in power density at locations in a typical part calculated using a finite element model of the heating process.

The improvement in heating within the part when using ferrite blocks was confirmed by a finite-element magnetic field analysis of the same configuration with and without the ferrite blocks. The results of a power density calculation are plotted in FIG. 6. Because the power density is more uniform with blocks, the heating will be more uniform.

Figure 8:
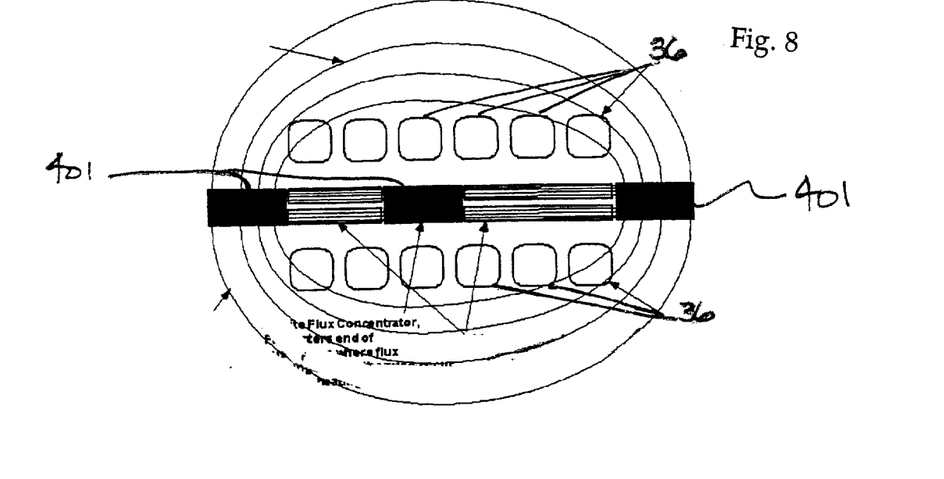
FIG. 8 is a schematic sectional view showing the induction heating work-cell configured into two separate heating zone by placing a ferrite block between workpieces.

This method of flux shaping is also useful to allow the simultaneous processing of a series of workpieces 403 along the coil, as shown in FIG. 8. The ferrite blocks 401 are placed along the centerline of the coil to separate the workpieces. They effectively define separate heating zones in the coil. In each zone, the magnetic flux 407 is substantially uniform (as shown by the straight flux lines) coming from one ferrite block at one end to a second ferrite block on the other end. The flux is idealized in FIGS. 8 and 9. A more accurate depiction of the flux around the coil is shown in FIG. 7. Of importance in FIG. 8 is the fact that the field between the ends of the part is uniform.

Figure 9:
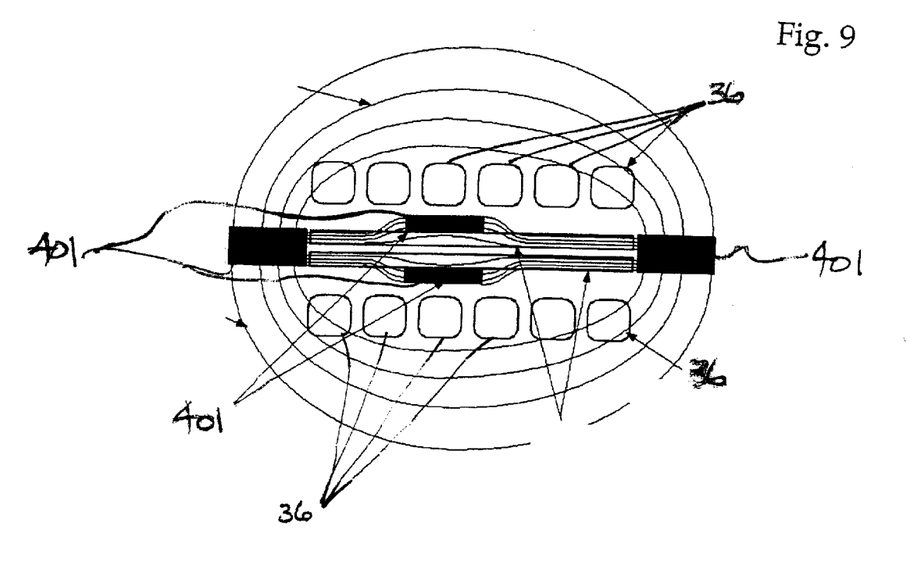
FIG. 9 is another schematic sectional view, similar to FIG. 8, showing the positioning of ferrite blocks to disperse flux in a predetermined portion of a workpiece.

The method can also be used to shunt magnetic flux around a portion of the workpiece that otherwise overheats because of the local shape, the conductivity, or the geometry of the workpiece (FIG. 9). The blocks 401 concentrate heating in selected locations by diverting the magnetic flux away from the part and into the blocks because of their higher magnetic permeability, as shown in FIG. 9. Blocks 401 positioned off the centerline on either side of a thermoplastic weld region, for example, might enhance the induction heating along the intended bondline while dissipating heating in regions remote from the intended bondline. At the bond line, flux is collected in the embedded susceptor 405, while outside the bondline, the blocks 401 channel the flux to reduce the induced eddy currents and to keep the part from heating at all. For the part shown in FIG. 9, heating would occur at each end of the part where significant flux 407 flows through the susceptors 405 in the part while heating would be reduced in the portion of the part where the blocks sandwiched the part. There, the flux is diverted through the blocks rather than through the part. My technique of ferrite blocks would be particularly beneficial if a susceptor were adhered over the entire surface of a composite detail part in a manner like Scoles suggests in U.S. patent application Ser. No. 08/688,071. The blocks would shunt magnetic flux from the susceptor in areas where bonds were undesirable.

The ferrite materials that I prefer to use are readily available in ceramic form. These materials have magnetic permeabilities as much as several thousand times the permeability of free space at room (ambient) temperature (around 20–23° C.). At elevated temperatures, the permeability decreases. The useful permeabilities, therefore, are in the range from about 10 to 100 times the permeability of the surrounding, non-magnetic materials. Permeabilities of this magnitude still allow diversion or shaping of the magnetic flux to obtain the desired control of the temperature uniformity within the workpiece.

These ferrite materials have very high resistivities and are considered to be electrical insulators. Virtually none of the energy in the magnetic field is dissipated in them by eddy currents being induced in them.

The blocks would be many times thicker than the dimension of the magnetic susceptor so that flux can easily pass through the blocks in the desired direction. When the blocks are used with non-magnetic susceptors that enclose the workpiece in a retort, the blocks should be substantially the same thickness as the workpiece so that the blocks provide a path of magnetic flux essentially parallel to the flux in the workpiece, as shown in FIG. 9.

The blocks usually are rectangular in cross section, but they could be tapered to function as a flux concentrator, as shown in FIG. 7. The width of the blocks when they are positioned along the centerline of the coil should be wide enough to collect the flux (lines 407, FIG. 8) for the flux passing around the coil edges and entering the top and bottom surfaces of the blocks substantially at right angles.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

I claim:

1. An induction heating apparatus, comprising:
    (a) a matched pair of ceramic dies defining a cavity for containing a workpiece, the dies containing a plurality of induction coil segments adjacent to the walls of the cavity to define a solenoid coil having open ends, wherein the cavity is within the solenoid coil; and
    (b) electrically nonconducting ferrite blocks positioned within the solenoid coil to improve uniformity of flux density from the coil.

2. The apparatus of claim 1 wherein the blocks are substantially along the centerline of the coil.

3. The apparatus of claim 2 wherein blocks are located at each open end of the coil.

4. A method for improving thermal uniformity of a workpiece, having a length, during an induction heating operation, comprising the steps of:
    (a) positioning the workpiece generally along the centerline of a solenoid induction coil so that the coil wraps around the workpiece along the length of the workpiece; and
    (b) positioning ferrite blocks at ends of the coil to alter the magnetic flux from the coil to produce a more uniform power density and improved thermal uniformity in the workpiece.

5. The method of claim 4 wherein the blocks are generally along the centerline of the coil.

6. The method of claim 4 wherein at least one ferrite block is positioned within the solenoid coil to define separate heating zones within the coil, and the method further comprises the step of:
    simultaneously heating at least one workpiece in each work zone.

7. The apparatus of claim 1 wherein ferrite blocks straddle the workpiece within the coil to shunt flux from an area of the workpiece otherwise prone to overheating.

8. The method of claim 4 further comprising the step of:
    positioning ferrite blocks within the coil, straddling the workpiece, to shunt magnetic flux away from a region of the workpiece prone to overheating.

* * * * *